United States Patent
Waltman et al.

(10) Patent No.: US 9,207,894 B2
(45) Date of Patent: Dec. 8, 2015

(54) PRINT PREVIEW WITH PAGE NUMBERING FOR MULTIPLE PAGES PER SHEET

(75) Inventors: David Waltman, Lake Stevens, WA (US); Zhao-Hong Max Mai, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 917 days.

(21) Appl. No.: 12/234,539

(22) Filed: Sep. 19, 2008

(65) Prior Publication Data

US 2010/0073692 A1 Mar. 25, 2010

(51) Int. Cl.
*G06F 15/00* (2006.01)
*G06F 3/12* (2006.01)
*G06F 17/21* (2006.01)

(52) U.S. Cl.
CPC ............ *G06F 3/1256* (2013.01); *G06F 3/1205* (2013.01); *G06F 3/125* (2013.01); *G06F 3/1284* (2013.01); *G06F 17/212* (2013.01); *G06F 17/217* (2013.01); *G06F 3/1208* (2013.01)

(58) Field of Classification Search
None
See application file for complete search history.

(56) References Cited

U.S. PATENT DOCUMENTS

| | | | |
|---|---|---|---|
| 6,556,310 B1 | 4/2003 | Livingston | |
| 6,633,310 B1 | 10/2003 | Andrew et al. | |
| 7,203,900 B2* | 4/2007 | Nara et al. | 715/255 |
| 7,555,723 B1* | 6/2009 | Coe | 715/769 |
| 2002/0044152 A1* | 4/2002 | Abbott et al. | 345/629 |
| 2003/0020956 A1* | 1/2003 | Goel et al. | 358/1.18 |
| 2004/0205607 A1* | 10/2004 | Kim et al. | 715/517 |
| 2005/0002061 A1* | 1/2005 | Uchida et al. | 358/1.18 |
| 2005/0213174 A1* | 9/2005 | Maki et al. | 358/540 |
| 2005/0259115 A1* | 11/2005 | Ternasky et al. | 345/619 |
| 2006/0028667 A1* | 2/2006 | Saito | 358/1.13 |
| 2006/0048067 A1 | 3/2006 | DeSpain et al. | |
| 2006/0203288 A1 | 9/2006 | Liccini et al. | |
| 2006/0288304 A1* | 12/2006 | Nomoto et al. | 715/781 |
| 2007/0211269 A1 | 9/2007 | Patrick et al. | |
| 2008/0155438 A1 | 6/2008 | Bonura et al. | |
| 2008/0278758 A1* | 11/2008 | Sakuramata | 358/1.18 |
| 2009/0122348 A1* | 5/2009 | Sato | 358/1.18 |
| 2009/0265625 A1* | 10/2009 | Tamai et al. | 715/274 |
| 2010/0011309 A1* | 1/2010 | Mitra et al. | 715/768 |
| 2010/0033501 A1* | 2/2010 | Whitesell et al. | 345/634 |
| 2011/0074813 A1* | 3/2011 | Masumoto | 345/629 |

OTHER PUBLICATIONS

Microsft office 2007.*
"AeroFox: Transparent Browser for Windows," http://www.aerofox.org/ [last accessed Dec. 1, 2008].

(Continued)

*Primary Examiner* — Helen Q Zong
(74) *Attorney, Agent, or Firm* — Jessica Meyers; Tom Wong; Micky Minhas

(57) ABSTRACT

A sheet preview system generates a print preview of a sheet that has a layout specifying a position and orientation for each page. To generate the print preview of the sheet, the sheet preview system displays a representation of the sheet that includes an image of each page of the sheet. The sheet preview system positions and orients the images in accordance with the layout of the sheet. The sheet preview system then displays in association with each displayed image of a page the page number of that page. The sheet preview system may orient the page number of the page in accordance with the orientation of the page.

22 Claims, 6 Drawing Sheets

(56) References Cited

OTHER PUBLICATIONS

Drewes, Heiko et al., "WYSIWYG-Tool Tips: Enhancing Tool Tips with Translucent Preview Bitmaps," Embedded Interaction Research Group, Media Informatics, University of Munich, Germany, Proceedings of International Symposium on Visual Computing (ISVC05). Springer LNCS vol. 3804, 2005, pp. 647-652 http://www.hcilab.org/documents/WysiwygToolTips_ISVC2005.pdf [last accessed Dec. 1, 2008].

Zanella, Ana et al., "Avoiding Interference through Translucent Interface Components in Single Display Groupware," 2000, In Extended Abstracts of the ACM Conference of Human Factors in Computing Systems (CHI'01), ACM Press, https://dspace.ucalgary.ca/bitstream/1880/45862/3/2000-674-26.pdf [last accessed Dec. 1, 2008].

* cited by examiner

PRINT PREVIEW WITH PAGE NUMBERING FOR MULTIPLE PAGES PER SHEET

BACKGROUND

Many publishing systems allow a user to create documents in which multiple pages of the documents are printed on a single sheet of paper. For example, a user may want to create a greeting card out of the single sheet of paper. The user creates a document that includes four pages that each have a page number. The first page represents the front cover of the greeting card, the second and third pages represent the insides of the greeting card, and the fourth page represents the back cover of the greeting card. The user can then print all four pages on a single sheet of paper. If the pages are printed in the appropriate orientation on the sheet, then the user can fold the sheet both horizontally and vertically to form the greeting card.

Users of publishing systems can create complex documents with many pages that are to be printed on many sheets with multiple pages per sheet. The pages of these complex documents may be divided into various types of divisions such as sections, chapters, and so on. In such a complex document, each page may have both a page number and a division. The page numbers may be sequential throughout the entire document or may restart at the beginning of each division.

Before a user prints a document, the user may want to use a print preview feature of the publishing system to check whether the layout (e.g., position and orientation) of the pages to be printed on each sheet is correct. The publishing system may generate a print preview for each sheet that includes an image of each page positioned and oriented on the sheet as it would be printed. The image of a page on the print preview typically contains the entire content of the page that would be printed.

A difficulty with typical publishing systems is that a user may not be able to easily determine from the print preview the page numbers of the pages that are to be printed at various positions on the sheet. For example, with a greeting card, the first page may be printed right side up in the lower right quadrant of the sheet, the second page may be printed upside down in the upper right quadrant of the sheet, the third page may be printed upside down in the upper left quadrant of the sheet, and the fourth page may be printed right side up in the lower left quadrant of the sheet. Because the contents of greeting cards typically do not include page numbers, a user has no readily available means to identify the page number of the page that will be printed in each quadrant. As a result, the user may not be able to easily determine whether each page will be printed in the appropriate position and orientation.

SUMMARY

A method and system is described that displays a print preview of a sheet with multiple pages that includes page numbers for each page that are not part of the content of the page when it is printed. A sheet preview system generates a print preview of a sheet that has a layout specifying a position and orientation for each page. To generate the print preview of the sheet, the sheet preview system displays a representation of the sheet that includes an image of each page of the sheet. The image of a page represents the content of that page when the page is printed. The sheet preview system positions and orients the images in accordance with the layout of the sheet. The sheet preview system then displays in association with each displayed image of a page the page number of that page. The sheet preview system may orient the page number of the page in accordance with the orientation of the page. When a page number overlays the image of a page, the sheet preview system may display the number in a transparent manner so that the overlaid content of the page can be seen through the page number.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
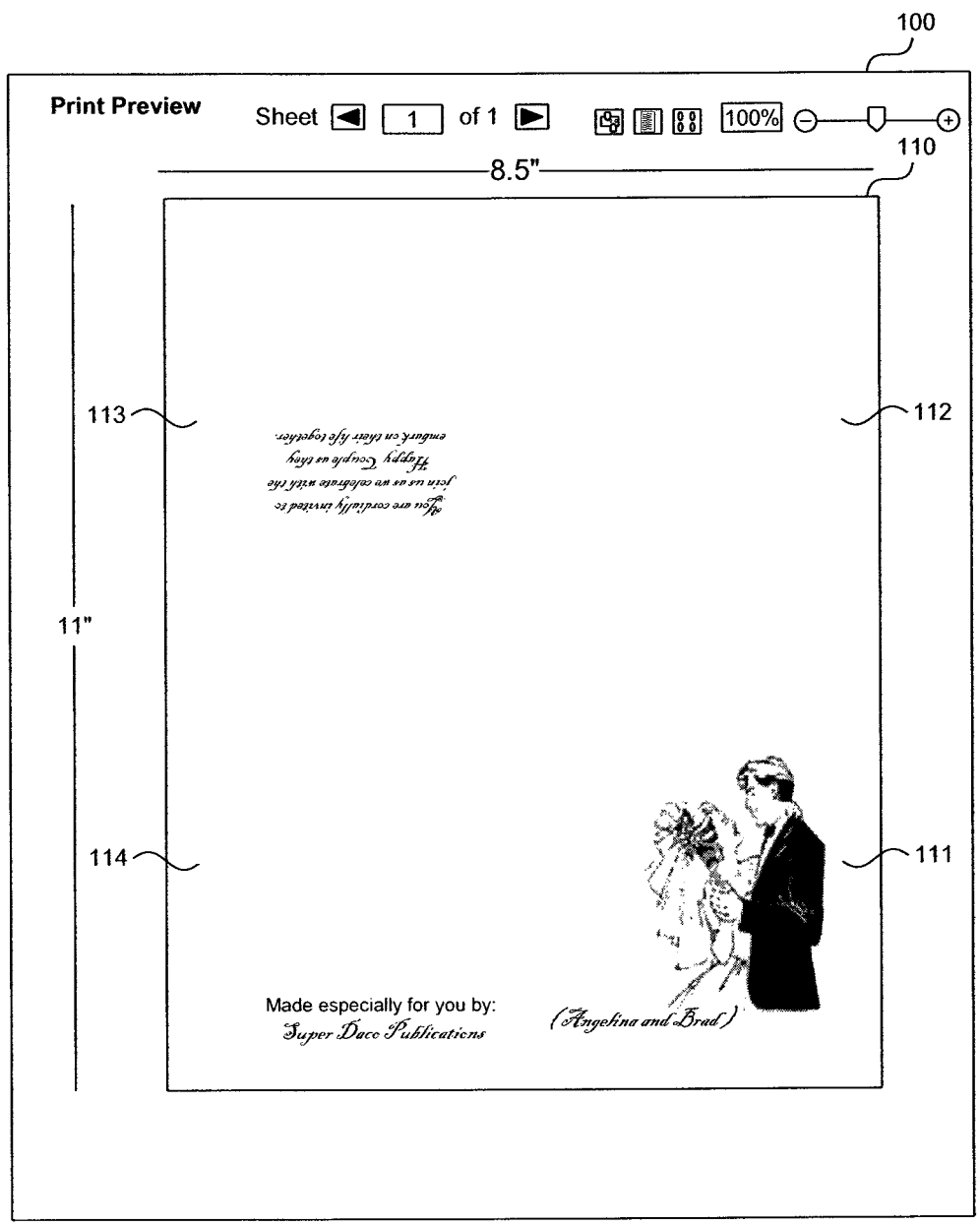
FIG. 1 illustrates a print preview of a sheet that lays out four pages for a greeting card.

A method and system is described that displays a print preview of a sheet with multiple pages that includes page numbers for each page that are not part of the content of the page when it is printed. In some embodiments, a sheet preview system generates a print preview of a sheet that has a layout specifying a position and orientation for each page. For example, the position for a page may specify the lower right quadrant of the sheet, and the orientation for a page may indicate to rotate the page 180 degrees. To generate the print preview of the sheet, the sheet preview system displays a representation of the sheet that includes an image of each page of the sheet. The image of a page represents the content of that page when the page is printed. The sheet preview system positions and orients the images in accordance with the layout of the sheet. The sheet preview system then displays in association with each displayed image of a page the page number of that page. For example, the sheet preview system may overlay the image with the page number or may display the page number near, but not overlaying, the page. The sheet preview system may orient the page number of the page in accordance with the orientation of the page. For example, if a page is oriented upside down on the sheet, then the sheet preview system may also display the number for that page upside down on the sheet. When a page number overlays the image of a page, the sheet preview system may display the number in a transparent manner so that the overlaid content of the page can be seen through the page number. In some embodiments, the sheet preview system may allow a user to specify the desired level of transparency, which may range from full transparency to no transparency. In this way, when a user previews a sheet that contains multiple pages, the user will know the page number of each page even though the content of the page may not include a page number or may include a page number in too small a size to be recognized.

In some embodiments, the sheet preview system may also display the division associated with each page of a sheet. The sheet preview system may display the division near the page number for the page and may display it at a smaller size than the page number. The sheet preview system may also apply the same transparency to the division as it does to the page number. In addition, the orientation of the division of a page may be the same as the orientation of that page.

In some embodiments, the sheet preview system may also display a border around each page of the sheet to help a user understand the boundary of each page. For example, if the sheet contains four pages with one in each of the four quadrants of the sheet, then the sheet preview system may display a line vertically down the middle of the sheet and a line horizontally across the middle of the sheet. The sheet preview system may allow a user to specify the desired level of transparency for the borders. The sheet preview system may allow the transparency of the borders to be independent of the transparency of the page numbers. Alternatively, the sheet preview system may allow the same transparency to apply to both the page numbers and the borders.

In some embodiments, the sheet preview system may allow a user to specify the transparency in various ways. The sheet preview system may provide a slider control box with a moveable slider to control the transparency. One end of the slider control box may correspond to full transparency, and the other end of the slider control box may correspond to no transparency. With full transparency, the page number is not displayed, as it is completely transparent. With no transparency, the page number is displayed but the content of the page overlaid by the page number is blocked by the page number. With partial transparency, the page number is displayed and the content of the overlaid page can be seen through the page number. As a user moves the slider, the sheet preview system adjusts the transparency. The sheet preview system may provide separate slider control boxes for page numbers, divisions, and borders or may provide one slider control box for page numbers and divisions or page numbers, divisions, and borders. The sheet preview system may provide a drop-down list of transparency percentages for selection by the user, may provide a data entry field for entry of a transparency percentage, and so on.

In some embodiments, the sheet preview system may provide a single slider control box that can be used to control the setting of different transparencies for page numbers and borders. One end of a single slider control box may correspond to full transparency for both page numbers and borders, and the other end of the slider control box may correspond to partial transparency for both page numbers and borders. When the slider is at the end of the slider control box corresponding to full transparency, then the sheet preview system displays no numbers and no borders. As the user moves the slider toward the other end of the slider control box, the sheet preview system decreases the transparency of the page numbers while leaving the borders at full transparency. When the transparency of the page number reaches no transparency, then as the user continues to move the slider, the sheet preview system decreases the transparency of the border while leaving the page numbers at no transparency. When the transparency of the border reaches no transparency, the sheet preview system displays both the page numbers and the borders with no transparency. As the user continues to move the slider, the sheet preview system increases the transparency of the page numbers until a designated transparency is reached. As the user further continues to move the slider, the sheet preview system increases the transparency of the borders to a designated transparency while leaving the page numbers at the designated transparency. When the slider reaches the other end of the slider control box, the sheet preview system displays both the page numbers and the borders in their designated transparencies. One skilled in the art will appreciate that one end of the slider control box could correspond to a high, rather than full, transparency.

FIG. 1 illustrates a print preview of a sheet that lays out four pages for a greeting card. A print preview window 100 includes a sheet 110 with pages 111-114. Page 111 corresponds to the first page, page 112 corresponds to the second page, page 113 corresponds to the third page, and page 114 corresponds to the fourth page of the greeting card. Pages 112 and 113 are printed upside down. After the sheet is printed, a person may fold the sheet horizontally at the middle of the sheet and then vertically at the middle of the sheet so that pages 112 and 113 form the inside of the greeting card.

Figure 2:
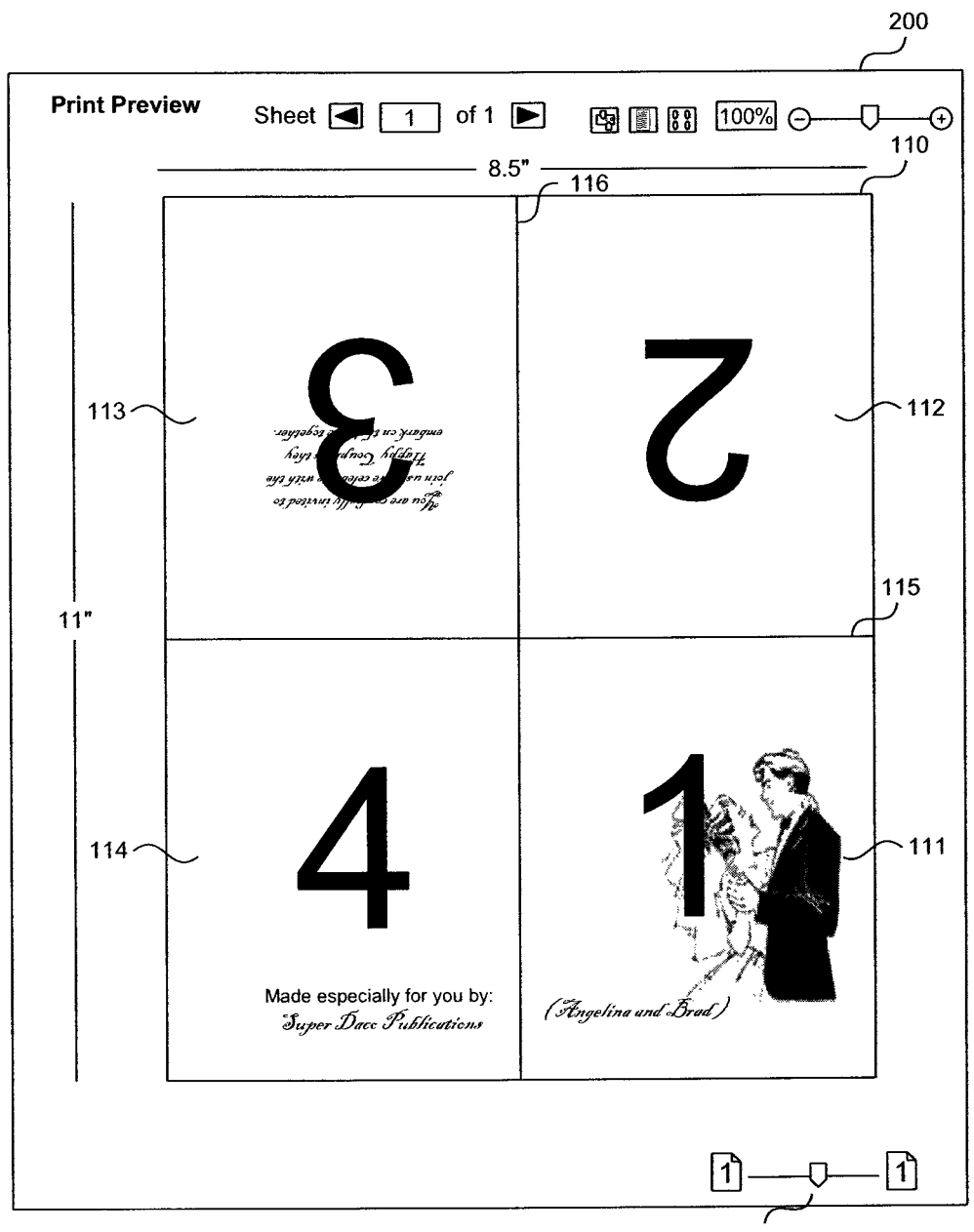
FIG. 2 illustrates a print preview of a sheet that lays out four pages for a greeting card with page numbers and borders overlaying the pages.

FIG. 2 illustrates a print preview of a sheet that lays out four pages for a greeting card with page numbers and borders overlaying the pages. The print preview window 200 includes sheet 110 with pages 111-114. The sheet preview system has overlaid each page with its page number. Page 111 is overlaid with a "1," page 112 is overlaid with a "2," page 113 is overlaid with a "3," and page 114 is overlaid with a "4." The sheet is also overlaid with a horizontal border 115 and a vertical border 116 to indicate the boundaries of the pages. A print preview window includes a slider control box 117 for controlling the transparency of both the page numbers and the borders. When the slider is positioned to the left of the slider control box, the sheet preview system displays the numbers with nearly full transparency. When the slider is positioned to the right of the slider control box, then the sheet preview system displays the numbers with no transparency. In some embodiments, rather than overlaying the image of a page with its page number, the sheet preview system may display page numbers adjacent to each page in much the same way as the reference numerals are displayed in FIG. 2.

Figure 3:
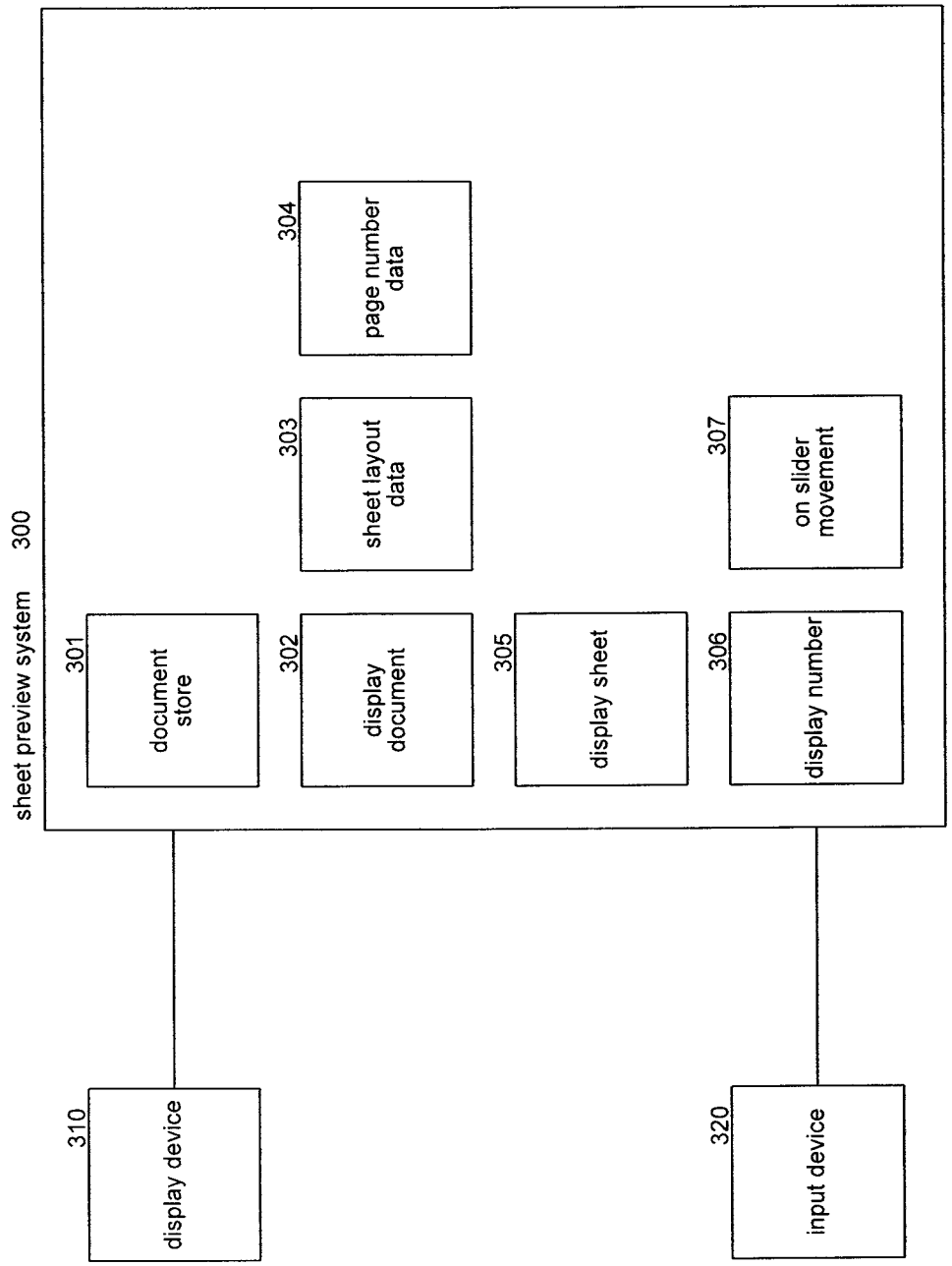
FIG. 3 is a block diagram that illustrates components of a sheet preview system in some embodiments.

FIG. 3 is a block diagram that illustrates components of the sheet preview system in some embodiments. The sheet preview system 300 may be implemented on a computing device that is connected to a display device 310 and an input device 320. The sheet preview system may include a document store 301, a display document component 302, a sheet layout data structure 303, a page number data structure 304, a display sheet component 305, a display number component 306, and an on slider movement component 307. The document store may include various documents that have been created for printing multiple pages on the sheet. The documents have pages with page numbers and may be organized into various divisions. The display document component is invoked when a user wants to preview sheets of a document. The display document component may open a selected document and store the sheet layouts in the sheet layout data structure. The page number data structure may contain bitmaps of numbers. The layout for a sheet may identify the number of pages to be displayed on the sheet (i.e., pages per sheet) and a layout for each page. The layout for each page may include the position and orientation for printing of a page on the sheet. The display document component may invoke the display sheet component to display a print preview for a selected sheet. The display sheet component displays an image of each page associated with the sheet in the position and orientation specified by the sheet layout. The display sheet component invokes the display number component to overlay the page number on the image of each page. The on slider movement component is invoked when a user moves the slider of the transparency slider control box. The on slider movement component invokes the display number component to display the page numbers in the designated transparencies. The sheet preview system may also allow the sheets to be printed with the page numbers and borders having a specified transparency. One skilled in the art will appreciate that these components can be adapted to display divisions and borders.

The computing device on which the sheet preview system may be implemented may include a central processing unit, memory, input devices (e.g., keyboard and pointing devices), output devices (e.g., display devices), and storage devices (e.g., disk drives). The memory and storage devices are computer-readable storage media that may contain instructions that implement the sheet preview system. In addition, the data structures and message structures may be transmitted via a computer-readable data transmission medium, such as a signal on a communications link. Various communications links may be used, such as the Internet, a local area network, a wide area network, or a point-to-point dial-up connection. The computer-readable media include computer-readable storage media and computer-readable data transmission media.

The sheet preview system may be implemented in and/or used by various operating environments. The operating environment described herein is only one example of a suitable operating environment and is not intended to suggest any limitation as to the scope of use or functionality of the sheet preview system. Other well-known computing systems, environments, and configurations that may be suitable for use include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The sheet preview system may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 4:
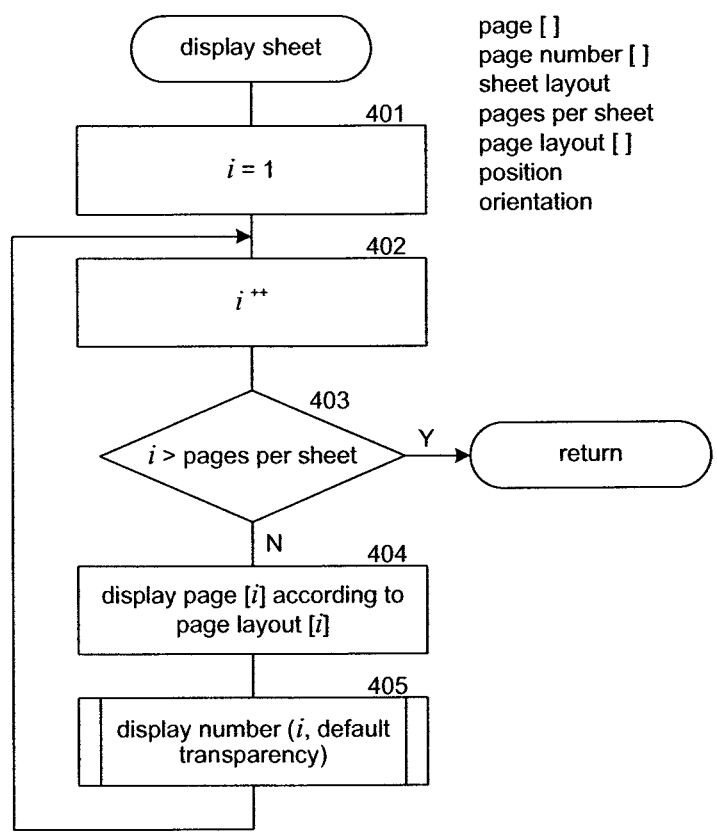
FIG. 4 is a flow diagram that illustrates the processing of a display sheet component of the sheet preview system in some embodiments.

FIG. 4 is a flow diagram that illustrates the processing of the display sheet component of the sheet preview system in some embodiments. The component may be passed an indication of the pages that are to be displayed on the sheet, bitmaps of page numbers of the pages, and the sheet layout data for the sheet. The component loops selecting each page and displaying it on the sheet in the appropriate position and orientation and overlaying the image of each page with its page number in a default transparency. In block 401, the component initializes a variable for selecting the pages. In block 402, the component increments the variable to select the next page starting with the first. In decision block 403, if the variable indicates that the number of pages per sheet has already been selected, then the component returns, else the component continues at block 404. In block 404, the component displays the selected page according to its page layout. In block 405, the component invokes the display number component passing an indication of the page and a default transparency. The component then loops to block 402 to select the next page of the sheet.

Figure 5:
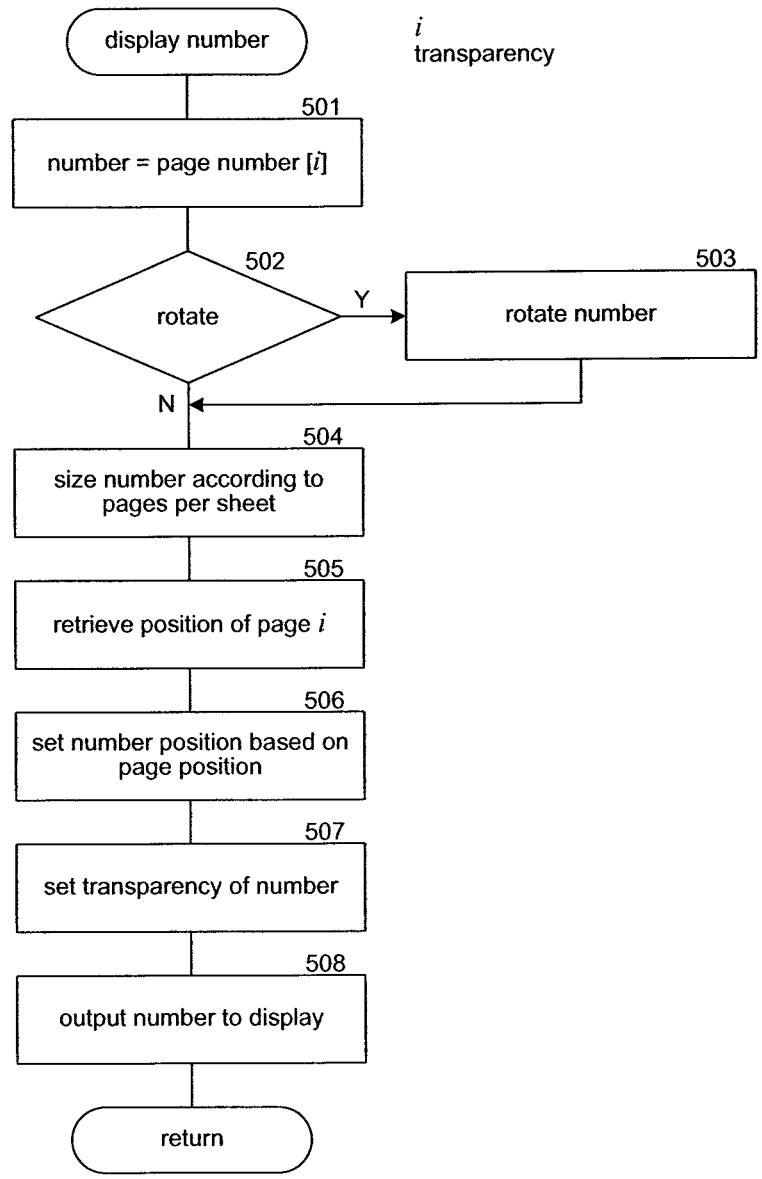
FIG. 5 is a flow diagram that illustrates the processing of a display number component of the sheet preview system in some embodiments.

FIG. 5 is a flow diagram that illustrates the processing of the display number component of the sheet preview system in some embodiments. The component is passed an indication of a page and displays the number of that page over the image of the page. In block 501, the component sets the variable number to an image of the page number for the selected page. The number may be a bitmap. In decision block 502, if the layout indicates that the page is to be rotated, then the component rotates the number in block 503, else the component continues at block 504. In block 504, the component sets the size of the number according to the number of pages per sheet. In block 505, the component retrieves the position for the selected page. In block 506, the component sets the position for the number on the sheet based on the position of the selected page of the sheet. For example, the component may set the position of the number so it overlays the center of the page. In block 507, the component sets the transparency of the number. In block 508, the component outputs the number and then returns.

Figure 6:
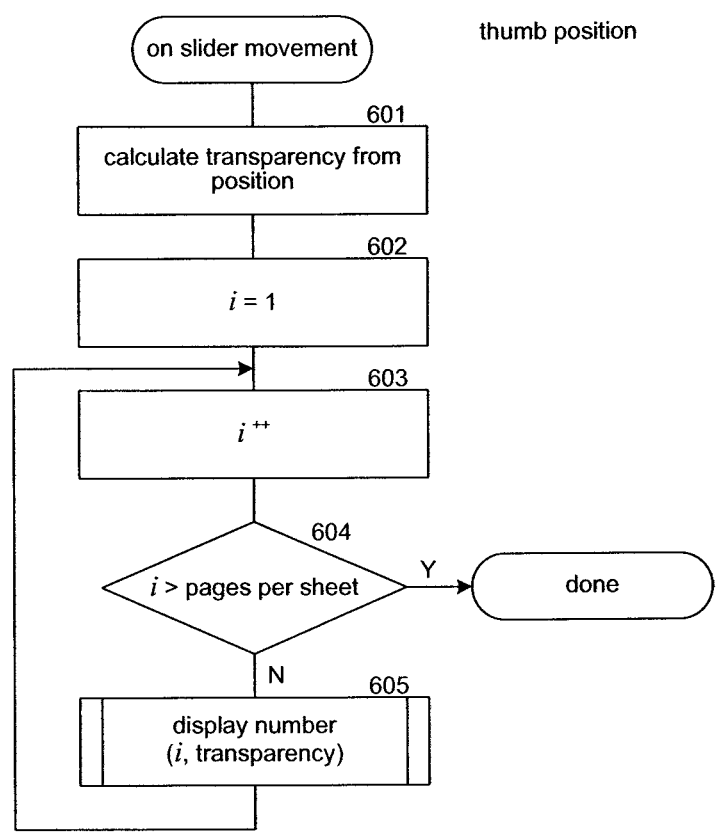
FIG. 6 is a flow diagram that illustrates the processing of an on slider movement component of the sheet preview system in some embodiments.

FIG. 6 is a flow diagram that illustrates the processing of the on slider movement component of the sheet preview system in some embodiments. The component is invoked when a user moves the slider of the slider control box. The component adjusts the transparency of the displayed numbers accordingly. In block 601, the component calculates the transparency from the slider position. In block 602, the component initializes a variable for selecting the pages of the sheet. In block 603, the component increments the variable to select the next page of the sheet starting with the first page of the sheet. In decision block 604, if the variable indicates that all pages of the sheet have already been selected, then the component completes, else the component continues at block 605. In block 605, the component invokes the display number component passing an indication of the selected page and the calculated transparency to adjust the transparency of the page number for the selected page. The component then loops to block 603 to select the next page.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims. For example, the images of pages and their overlaying page numbers may be stored in memory as a bitmap before displaying the bitmap. Accordingly, the invention is not limited except as by the appended claims.

We claim:

1. A method in a computing device with a display for displaying a print preview representation of a sheet containing multiple pages of a document, the pages of the document having page numbers that are not printed when the pages are printed, the method comprising:

providing multiple pages to be printed on a sheet, the sheet having a layout specifying a position and an orientation for each page, the position of a page specifying where the page is to be printed on the sheet, the orientation of a page specifying how the page is to be oriented when printed on the sheet;

displaying on the display a print preview representation of the sheet, the representation of the sheet including an image of each page of the sheet, the image of each page including content of that page that is printed on the sheet when the sheet is printed but not including the page number of the page, the images of the pages being positioned and oriented in accordance with the layout of the sheet; and displaying adjacent to each displayed image a page of the print preview representation the page number of the page, the displayed page number for each page not being included on the page when the page is printed, wherein the displayed image of a page that includes content of that page is displayed simultaneously with the displayed page number of that page, so that a user viewing the print preview representation can identify the page number of each page even though the content of the page does not include a page number.

2. The method of claim 1 wherein each page number of a page is positioned and oriented in accordance with the position and orientation of the page.

3. The method of claim 1 wherein the document is divided into divisions, with each page being in a division, and including displaying the division that the page is in, the displayed division not being part of the content of the page when the page is printed.

4. The method of claim 3 wherein the division of a page is positioned and oriented in accordance with the position and orientation of the page and overlays the image of the page.

5. The method of claim 4 wherein each division of a page is displayed near the displayed page number at a smaller size than a size at which the page number is displayed.

6. The method of claim 1 wherein the page numbers are displayed with a transparency specified by a user.

7. The method of claim 6 including providing a slider with a thumb so that the user can specify the transparency of the page numbers by moving the thumb.

8. The method of claim 1 including displaying on the displayed sheet a representation of borders between the displayed pages.

9. The method of claim 8 wherein the borders are displayed with the transparency specified by a user.

10. The method of claim 9 wherein the page numbers are displayed with the transparency specified by the user.

11. The method of claim 9 including providing a slider with a thumb so that the user can specify the transparency of both the page numbers and the borders, wherein as the thumb is moved in one direction, starting with full transparency of both the page numbers and borders, the transparency of the page numbers decreases to no transparency while the borders are at full transparency, then the transparency of the borders decreases to no transparency while the page numbers are at no transparency, then the transparency of the page numbers increases to a designated transparency while the transparency of the borders are at no transparency, and then the transparency of the borders increases to the designated transparency while the page numbers are at the designated transparency.

12. A computing device that generates a print preview of a sheet containing multiple pages of a document, the pages of the document having page numbers that are not printed when the pages are printed, comprising: a data store storing an indication of multiple pages specified to be printed on the same sheet at specified positions and orientations; a component that generates a sheet image representing a print preview of the sheet, the sheet image including an image of each page of the sheet, the image of each page including content of that page that is to be printed on the sheet, the images of the pages being positioned and oriented in accordance with the specified positions and orientations, the images of the pages not including page numbers; and a component that adds to the image of each page the page number of the page, the page number for each page not being part of content of the page when the page is printed, wherein the added page number overlays a portion of the image of the page.

13. The computing device of claim 12 wherein each page number of a page is positioned and oriented in accordance with the specified position and orientation of the page.

14. The computing device of claim 12 wherein the document is divided into divisions with each page being in a division and including a component that adds to the image of each page the division of that page.

15. The computing device of claim 13 wherein the division of a page is positioned and oriented in accordance with the position and orientation of that page.

16. The computing device of claim 12 wherein the page numbers are added to the images of the pages with a transparency specified by a user.

17. The computing device of claim 12 wherein borders are added to the sheet to indicate borders of the pages.

18. The method of claim 1 wherein the displayed page number for each page is displayed adjacent to the displayed page.

19. The method of claim 1 wherein the displayed page number for a page is displayed adjacent to the displayed page with a line drawn from the displayed page number to the displayed page.

20. A computer-readable storage that is not a signal storing computer-executable instructions for controlling a computing device with a display to display a print preview representation of a sheet containing multiple pages of a document, the computer-executable instructions comprising instructions that:

display on the display a print preview representation of the sheet, the representation of the sheet including an image of each page of the sheet, the image of each page including content of that page that is printed on the sheet when the sheet is printed, the content not including a page number of the page, the images of the pages being positioned and oriented in accordance with the layout of the sheet; and display the page number of each page of the sheet to overlay the displayed image of that page so that a user viewing the print preview representation can identify the page number of each page even though the content of the page does not include a page number.

21. The computer-readable storage of claim 20 wherein each page number that overlays of a page is positioned and oriented in accordance with the position and orientation of that page.

22. The method of claim 1 further comprising displaying on the display a line from a displayed page number for a page to the displayed image of that page.

* * * * *